United States Patent
Gavade et al.

(10) Patent No.: US 9,712,859 B2
(45) Date of Patent: Jul. 18, 2017

(54) GENERATING A PLAYLIST THAT INCLUDES LOCAL SEGMENT IDENTIFIERS AND REMOTE SEGMENT IDENTIFIERS FOR MEDIA CONTENT

(71) Applicant: Verizon Patent and Licensing Inc., Arlington, VA (US)

(72) Inventors: Sameer Gavade, Irving, TX (US); Sanjay Ahuja, Irving, TX (US); Venkata S. Adimatyam, Irving, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 20 days.

(21) Appl. No.: 14/926,105

(22) Filed: Oct. 29, 2015

(65) Prior Publication Data

US 2017/0127111 A1    May 4, 2017

(51) Int. Cl.
| | |
|---|---|
| H04N 21/4147 | (2011.01) |
| H04N 21/262 | (2011.01) |
| H04N 21/845 | (2011.01) |
| H04N 21/84 | (2011.01) |
| H04N 21/4335 | (2011.01) |
| H04N 21/2747 | (2011.01) |
| H04N 21/438 | (2011.01) |

(52) U.S. Cl.
CPC ... *H04N 21/26258* (2013.01); *H04N 21/2747* (2013.01); *H04N 21/4335* (2013.01); *H04N 21/4383* (2013.01); *H04N 21/84* (2013.01); *H04N 21/8455* (2013.01); *H04N 21/8456* (2013.01)

(58) Field of Classification Search
CPC combination set(s) only.
See application file for complete search history.

(56) References Cited

U.S. PATENT DOCUMENTS

2012/0072286 A1*   3/2012   Kilar ............... G06Q 30/02
                                                                705/14.55

* cited by examiner

*Primary Examiner* — Kieu Oanh T Bui

(57) ABSTRACT

A device may receive a segment of media content, and may store the segment in a first location local to the device. The device may generate a playlist, for accessing the media content, that includes a first segment identifier that identifies the first location local to the device. The device may determine that the first segment identifier is to be replaced with a second segment identifier that identifies a second location, remote from the device, from which the segment is accessible. The device may replace, in the playlist, the first segment identifier with the second segment identifier based on determining that the first segment identifier is to be replaced with the second segment identifier. The device may delete the segment from the first location.

20 Claims, 6 Drawing Sheets

GENERATING A PLAYLIST THAT INCLUDES LOCAL SEGMENT IDENTIFIERS AND REMOTE SEGMENT IDENTIFIERS FOR MEDIA CONTENT

BACKGROUND

A digital video recorder (DVR) may refer to a device that records media content (e.g., audio, video, television programming, etc.) to memory, which enables playback of the media content at a time convenient to a user, rather than a time of distribution or broadcast. A DVR may also be used to pause or rewind the media content.

DETAILED DESCRIPTION OF PREFERRED EMBODIMENTS

The following detailed description of example implementations refers to the accompanying drawings. The same reference numbers in different drawings may identify the same or similar elements.

A media server, such as a set-top box, a digital video recorder (DVR), or the like, may be used to play and record media content. The media server may include a local memory, such as a hard disk drive, to store recordings of media content. In some cases, the media server may record and store media content for multiple media clients, such as other set-top boxes (e.g., located in different rooms of a user's home). For example, the media server may record multiple television channels concurrently, and may switch a recording based on input to tune to a different channel. This configuration may consume a large amount of memory resources on the media server, may strain a hard disk drive of the media server, may consume a large amount of power, or the like. Implementations described herein allow a media server to store a small amount of media content locally, while offloading some media content storage to remote storage devices and generating a playlist that permits a media client to access the media content from the remote storage devices. In this way, the media server may conserve resources, such as memory resources, processing resources, power, or the like.

Figure 1A:
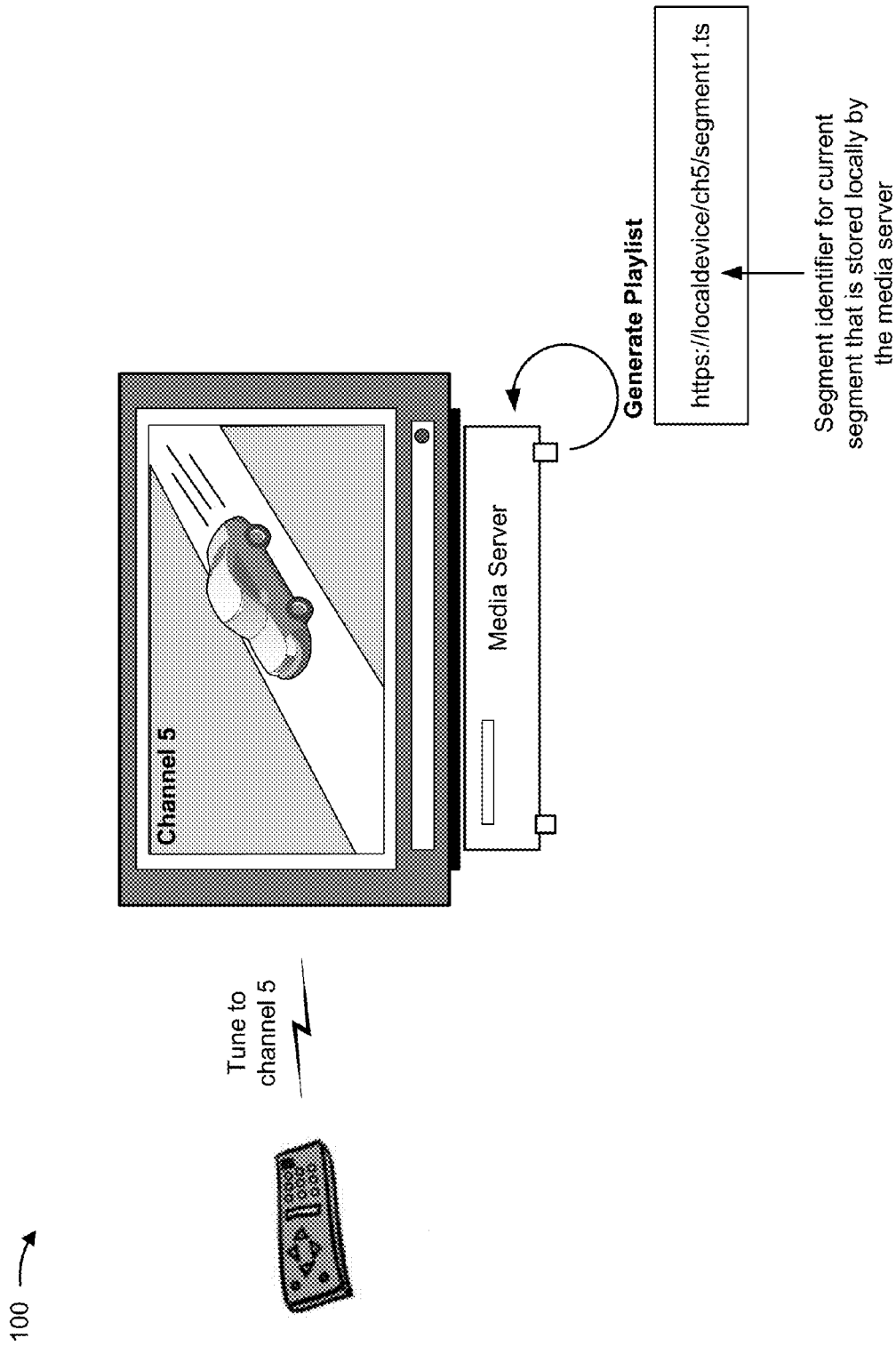
FIGS. 1A-1C are diagrams of an overview of an example implementation described herein.
Figure 1B:
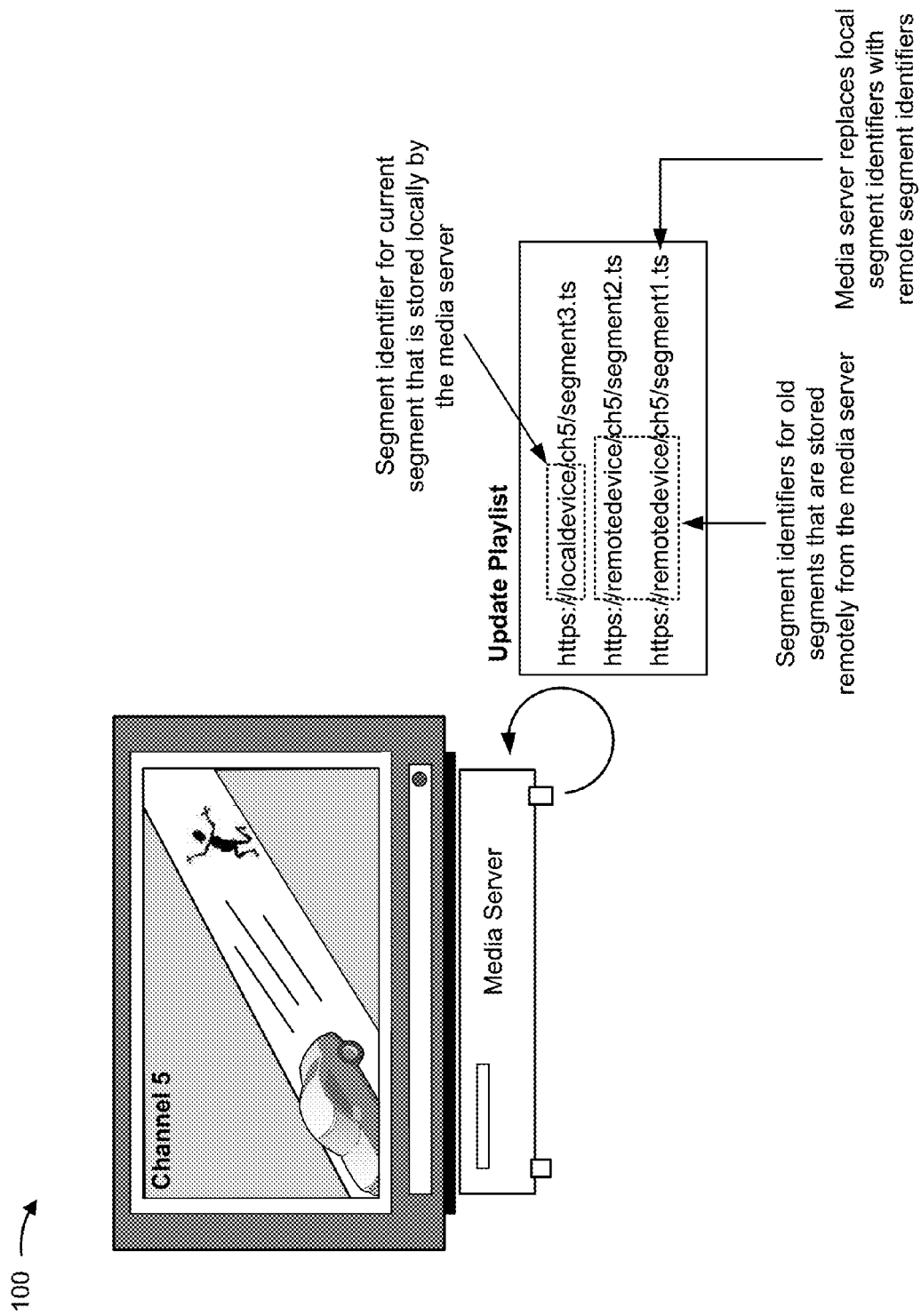
Figure 1C:
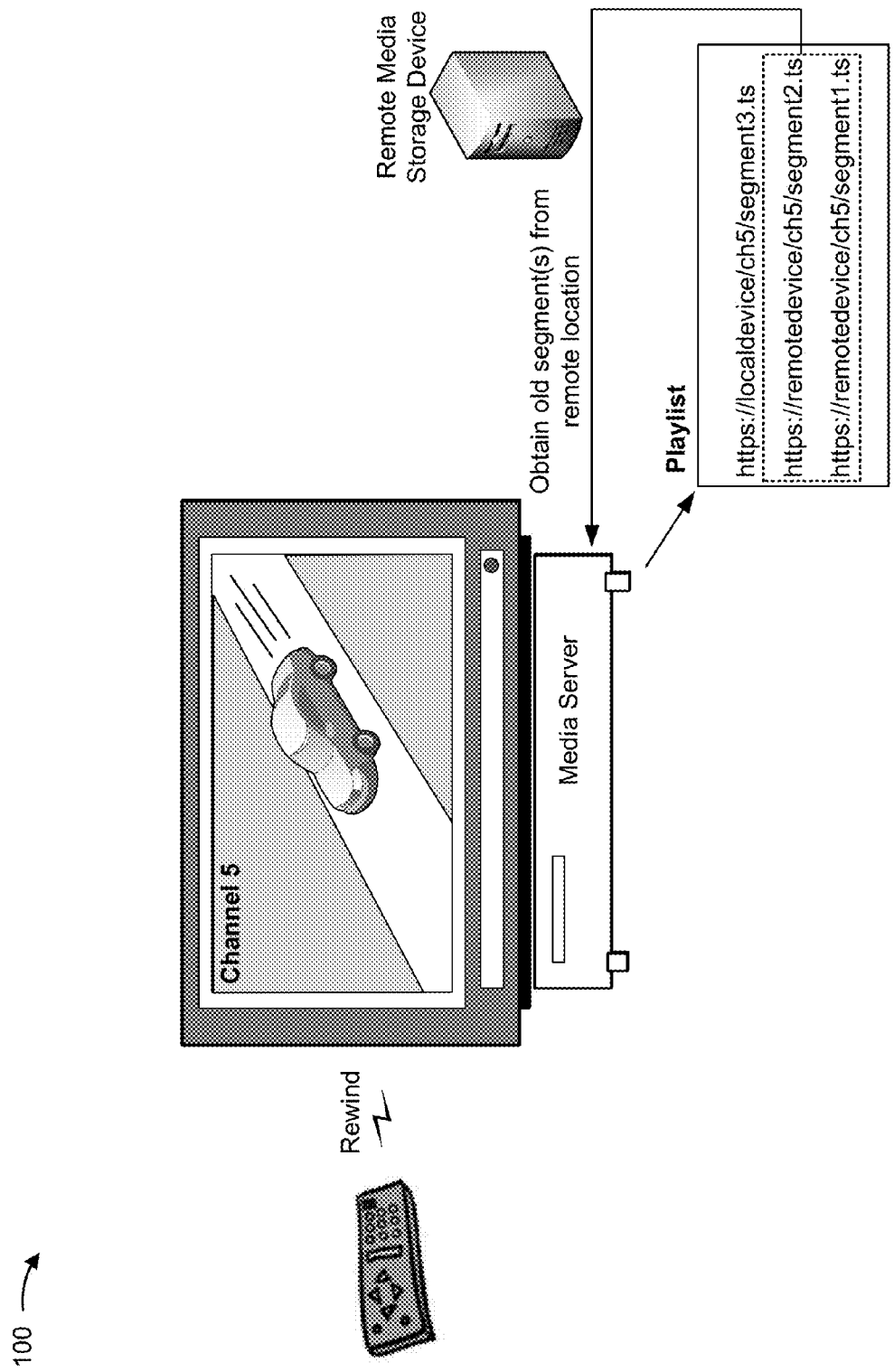

FIGS. 1A-1C are diagrams of an overview of an example implementation 100 described herein. As shown in FIG. 1A, assume that a media server, such as a set-top box, receives input to tune to a particular television channel, shown as channel 5. Based on this input, the media server tunes to channel 5 and begins recording media content provided via channel 5 (e.g., so that a user may pause the media content, rewind the media content, fast-forward the media content, etc.). As shown, the media server generates a playlist that identifies locations where segments of the media content are stored. For example, the media content may be divided into multiple segments of a particular length (e.g., 5 seconds, 10 seconds, etc.), which may be stored. As shown, assume that the media server stores a current segment (e.g., the most recently received segment) in a location local to the media server (e.g., in a memory of the media server), and uses the segment identifier of "https://localdevice/ch5/segment1.ts" to identify the segment stored locally by the media server.

As shown in FIG. 1B, assume that the media server receives additional segments of the media content over time. The media server may update the playlist to identify locations where the additional segments are stored. As described above, assume that the media server stores a current segment, which is now "https://localdevice/ch5/segment3.ts," in a location local to the media server. Further, assume that the media server replaces segment identifiers for old segments (e.g., shown as "https://localdevice/ch5/segment1.ts" and "https://localdevice/ch5/segment2.ts") with segment identifiers that identify locations that are remote from the media server. For example, the media server has replaced a local segment identifier for "segment1.ts," which identified a location local to the media server, with a remote segment identifier that identifies a location remote from the media server. In this way, the media server can remove old segments from memory, thereby conserving memory resources while still permitting the old segments to be accessed via a remote storage device.

As shown in FIG. 1C, assume that the media server receives input to rewind the media content being received via channel 5. In this case, the media server may use the playlist to identify a location where an old segment, that is being rewound to, is stored. For example, the media server may use remote segment identifiers included in the playlist to determine that "segment2" and "segment1" are stored on a remote media storage device. The media server may obtain these segments from the remote media storage device, and may play the obtained segments (e.g., during a rewind operation, during a play operation after a rewind operation, etc.). In this way, the media server may conserve memory resources, processing resources, power, etc., by offloading recording and/or storage of media content to remote devices, while still permitting the media content to be accessed (e.g., for rewinding, playback, etc.).

Figure 2:
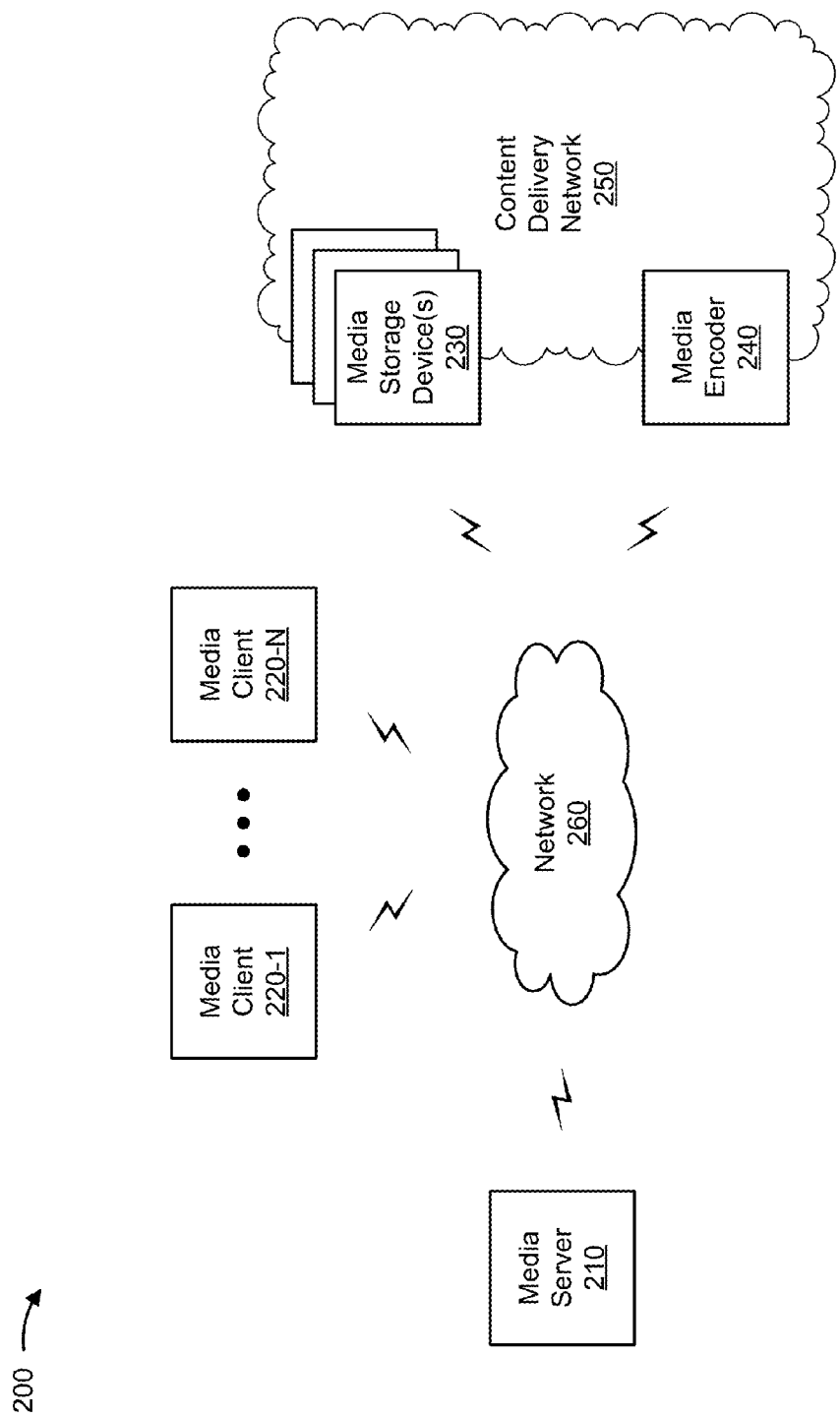
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a media server 210, one or more media clients 220-1 through 220-N (hereinafter referred to individually as "media client 220," and collectively as "media clients 220"), one or more media storage devices 230, a media encoder 240, a content delivery network 250, and/or a network 260. Devices of environment 200 may interconnect via wired connections, wireless connections, or a combination of wired and wireless connections.

Media server 210 may include one or more devices capable of receiving, storing, processing, and/or providing media content. For example, media server 210 may include a set-top box, a DVR, a computer, or a similar type of device. Media server 210 may request and/or receive media content (e.g., from content delivery network 250), and may output the media content. In some implementations, media server 210 may output the media content to a display device (e.g., a television, a screen, etc.), an audio device (e.g., a speaker, etc.), or the like. Additionally, or alternatively, media server 210 may provide the media content to media client 220, which may output the media content to a display device, an audio device, or the like. In some implementations, media server 210 may output different media content to different media clients 220. Additionally, or alternatively, media server 210 may record and/or store segments of media content, and may provide the segments of media content (e.g., to a display device, to media client 220, etc.).

Media client 220 may include one or more devices capable of receiving, storing, processing, and/or providing media content. For example, media client 220 may include a set-top box, a casting stick (e.g., a high-definition media interface (HDMI) dongle), a smart phone, a tablet computer, a laptop computer, a desktop computer, a television, a cable card, a gaming device, a portable electronic device, or a similar type of device. In some implementations, media client 220 may request media content from media server 210. Media server 210 may obtain the content (e.g., from a memory local to media server 210, from a memory remote from media server 210, etc.), and may provide the content to media client 220.

Media storage device 230 may include one or more devices, such as one or more server devices, capable of receiving, storing, and/or providing media content. For example, media storage device 230 may include a server device separate from (e.g., remote from) media server 210. Media storage device 230 may record and/or store media content, and may provide the stored media content to media server 210 (e.g., upon request).

Media encoder 240 may include one or more devices capable of encoding media content to form segments of media content. For example, media encoder 240 may include a server device or a similar type of device. In some implementations, media encoder 240 may receive media content (e.g., via content delivery network 250), and may encode the media content into multiple segments (e.g., segments having a particular size, a particular bitrate, a particular quality level, etc.). Media encoder 240 may provide segments of the media content for delivery to media server 210 and/or media storage device(s) 230.

Content delivery network 250 may include one or more wired and/or wireless networks. In some implementations, content delivery network 250 may include a distributed system of server devices (e.g., in one or more data centers) to receive media content (e.g., from a content provider) and to provide the media content for distribution. For example, content delivery network 250 may include a wide area network (WAN), a metropolitan area network (MAN), a cellular network, a public land mobile network (PLMN), a local area network (LAN), a telephone network (e.g., the Public Switched Telephone Network (PSTN)), a private network, an ad hoc network, an intranet, the Internet, a fiber optic-based network, a television network, a cloud computing network, or the like, and/or a combination of these or other types of networks.

Network 260 may include one or more wired and/or wireless networks. For example, network 260 may include a cellular network (e.g., a long-term evolution (LTE) network, a 3G network, a code division multiple access (CDMA) network, etc.), a PLMN, a LAN, a WAN, a MAN, a telephone network (e.g., the PSTN), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
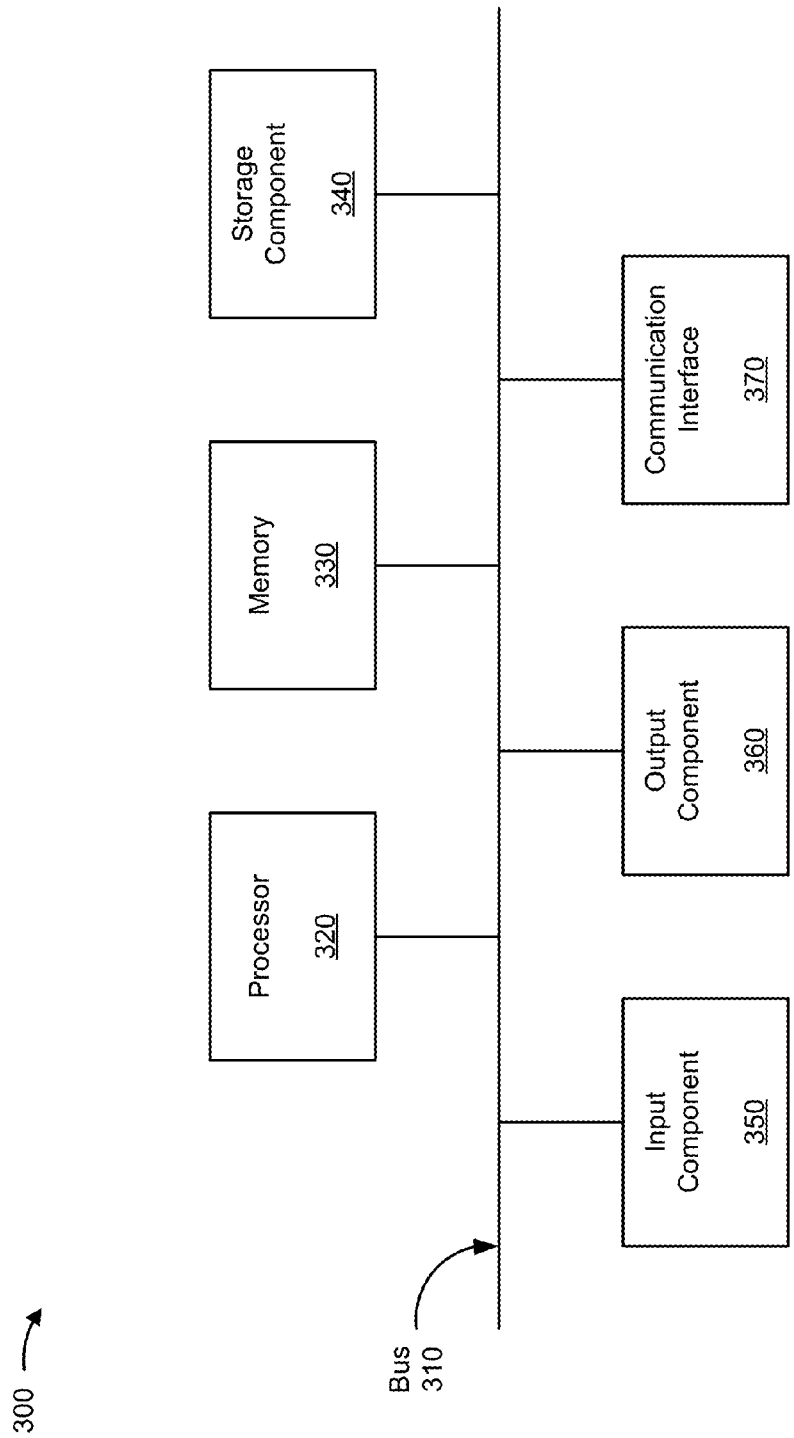
FIG. 3 is a diagram of example components of one or more devices of FIG. 2.

FIG. 3 is a diagram of example components of a device 300. Device 300 may correspond to media server 210, media client 220, media storage device 230, and/or media encoder 240. In some implementations, media server 210, media client 220, media storage device 230, and/or media encoder 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
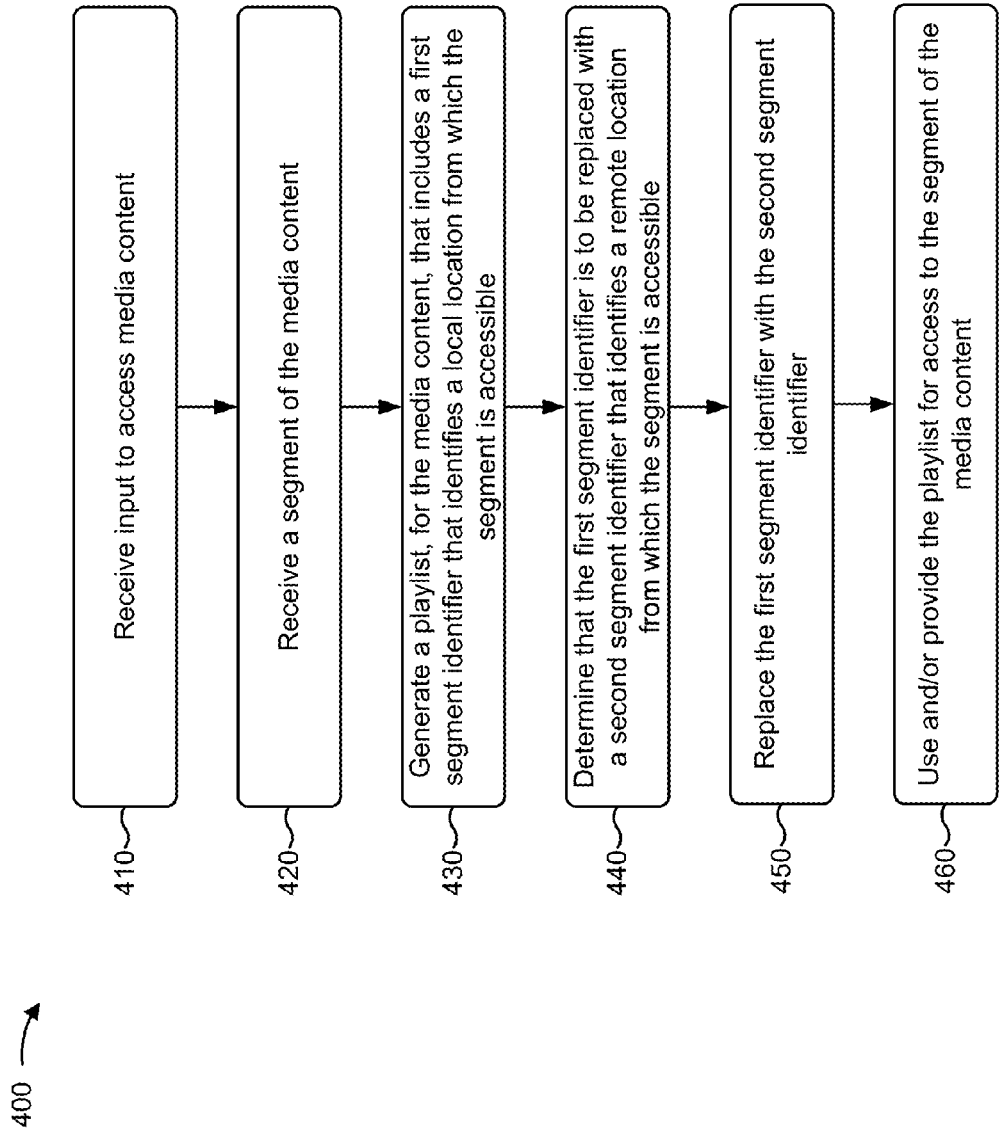
FIG. 4 is a flow chart of an example process for generating a playlist that includes local segment identifiers and remote segment identifiers for media content.

FIG. 4 is a flow chart of an example process 400 for generating a playlist that includes local segment identifiers and remote segment identifiers for media content. In some implementations, one or more process blocks of FIG. 4 may be performed by media server 210. In some implementations, one or more process blocks of FIG. 4 may be performed by another device or a group of devices separate from or including media server 210, such as media client 220, media storage device 230, and/or media encoder 240.

As shown in FIG. 4, process 400 may include receiving input to access media content (block 410). For example, media server 210 may receive input to access media content. In some implementations, media server 210 may receive the input via an input mechanism associated with media server 210, such as a remote control, an input button, or the like. Additionally, or alternatively, media server 210 may receive the input from another device, such as media client 220.

In some implementations, the input may cause media server 210 to tune to a channel (e.g., a television channel, a radio channel, etc.), and to receive media content via the channel. The media content may include, for example, television content (e.g., provided via a live or prerecorded television broadcast), web content, streaming content, audio content, video content, audiovisual content, or the like. Based on the input, media server 210 may receive the media content.

As further shown in FIG. 4, process 400 may include receiving a segment of the media content (block 420). For example, media server 210 may receive a segment of the media content, which may be encoded by media encoder 240. The segment of media content may have a length that is shorter than the entirety of the media content. For example, the media content may be part of a television broadcast, and the segment may be, for example, a subset of the television broadcast (e.g., a ten second segment, a thirty second segment, a one minute segment, etc.). Media server 210 may receive the segment from, for example, content delivery network 250.

The segment of media content may have a particular length, a particular size (e.g., a particular file size), a particular bitrate, a particular quantity of frames, a particular quality level (e.g., high definition, standard definition, etc.), or the like. Different segments may have the same or different lengths, sizes, bitrates, quantity of frames, quality level, or the like. Additionally, or alternatively, the segment of media content may be in a particular format, such the Moving Picture Experts Group (MPEG) Transport Stream file format, a Dynamic Adaptive Streaming over Hypertext Transfer Protocol (DASH) file format, or the like.

In some implementations, media server 210 may output the received segment of media content. For example, media server 210 may output the segment of media content for playback by a display device in communication with media server 210, may output the segment of media content to one or more media clients 220, which may in turn output the segment of media content to a display device, or the like. Additionally, or alternatively, media server 210 may record the segment of media content. For example, media server 210 may receive the segment of media content, and may store the segment of media content in a memory local to media server 210. In this way, a user may provide input to rewind to the segment after additional segments are received and output. For example, if the media content is television content, then media server 210 may store the segment to permit a user to provide input to rewind the television content, to pause and resume playback of the television content, to fast-forward after rewinding or pausing the television content, or the like.

In some implementations, media server 210 may provide a message to instruct media storage device 230 to record the media content (e.g., segments of the media content). For example, media server 210 may receive input to tune to a channel, and may then provide a message to media storage device 230 that instructs media storage device 230 to record media content transmitted via the channel. In this way, media server 210 may access remotely stored segments of media content when performing operations associated with playback of the media content (e.g., pausing, rewind, fast-forwarding, playing, etc.), thereby conserving memory resources of media server 210 that would otherwise be used to store the segments.

As further shown in FIG. 4, process 400 may include generating a playlist, for the media content, that includes a first segment identifier that identifies a local location from which the segment is accessible (block 430). For example, media server 210 may generate a playlist (e.g., in a playlist file), which may be used to perform operations associated with playback of the media content. The media content may be divided into multiple segments, and the playlist may identify an order of the segments and a location (e.g., a device, an address, a network address, a memory location, etc.) from which the segments are accessible.

The playlist may include multiple segment identifiers. A segment identifier may identify a location from which a segment of media content can be accessed. For example, a segment identifier may include a uniform resource identifier (URI) (e.g., a uniform resource locator (URL), a uniform resource name (URN), etc.), a network address, a memory address, or the like. A segment identifier may be a local segment identifier that identifies a local location from which a segment is accessible, or may be a remote segment identifier that identifies a remote location from which a segment is accessible. A local location may refer to a location local to media server 210 (e.g., included in a memory of media server 210, internal to media server 210, information stored by media server 210, etc.), and a remote location may refer to a location remote from media server 210 (e.g., not included in a memory of media server 210, external to media server 210, information not stored by media server 210, etc.). For example, the remote location may include a location in a memory of media storage device 230.

In some implementations, media server 210 may store a most recently received segment (e.g., a segment currently being received, a segment received most current in time, etc.) locally. Additionally, or alternatively, media server 210 may store a particular quantity of most recently received segments locally. Media server 210 may use a local segment identifier to identify a location, local to media server 210, in which a locally stored segment is stored. Media server 210 may modify the playlist to include a local segment identifier when a new segment is received and/or recorded by media server 210. In this way, one or more most recently received segments may be recorded and stored by media server 210. As additional segments are received, media server 210 may replace a local segment identifier with a remote segment identifier to conserve memory resources of media server 210, as described below.

As further shown in FIG. 4, process 400 may include determining that the first segment identifier is to be replaced with a second segment identifier that identifies a remote location from which the segment is accessible (block 440). For example, media server 210 may determine that a first segment identifier (e.g., a local segment identifier) is to be replaced with a second segment identifier (e.g., a remote segment identifier). The first segment identifier may identify a local location where a segment of media content is stored (e.g., by media server 210), and the second segment identifier may identify a remote location where the segment of media content is stored (e.g., by media storage device 230). As an example, the second segment identifier may be a remote segment identifier that identifies a location of media storage device 230. In this way, media server 210 may offload storage of segments of media content to a remote device (e.g., media storage device 230).

In some implementations, media server 210 may determine to replace, in the playlist, a local segment identifier with a remote segment identifier based on determining that one or more conditions are satisfied. In some cases, media server 210 may be configured to limit the quantity of segments stored locally, thereby conserving memory resources of media server 210. For example, media server 210 may determine a quantity of locally stored segments, may determine a quantity of local segment identifiers included in the playlist, or the like. When the quantity satisfies a threshold, media server 210 may determine to replace one or more local segment identifiers with one or more corresponding remote segment identifiers.

As another example, media server 210 may determine to replace a local segment identifier with a remote segment identifier when a new segment is received. In other words, for each new segment that is received and stored locally (e.g., temporarily), an old segment may be deleted locally, and a local segment identifier for the old segment may be replaced with a remote segment identifier. Additionally, or alternatively, media server 210 may determine to replace a local segment identifier with a remote segment identifier after a segment, corresponding to the local segment identifier, has been output (e.g., for playback, to a display device, to media client 210, etc.). For example, media server 210 may output a segment, and may determine to replace a local segment identifier, for the segment, with a remote segment identifier for the segment based on outputting the segment. In this way, media server 210 may maintain a quantity of locally stored segments, thereby conserving memory resources as compared to storing all segments locally.

Additionally, or alternatively, media server 210 may determine to replace a local segment identifier with a remote segment identifier based on determining that a threshold quantity of new segments have been received since the playlist was last updated to replace local segment identifiers with remote segment identifiers. In this case, media server 210 may replace, in the playlist, the threshold quantity of oldest local segment identifiers with remote segment identifiers (e.g., and deleting the oldest locally stored segments from memory), thereby maintaining a quantity of locally stored segments.

In some cases, media server 210 may be configured to limit an amount of memory space used to store segments of media content. For example, media server 210 may determine an amount of available (e.g., unused) memory space, an amount of unavailable (e.g., used) memory space, an amount of memory space used to store segments of media content, or the like. When the amount satisfies a threshold, media server 210 may determine to replace one or more local segment identifiers with one or more corresponding remote segment identifiers. In this way, media server 210 may conserve memory resources.

Additionally, or alternatively, media server 210 may determine an amount of time that has elapsed since a segment of media content has been received, an amount of time that has elapsed since a segment of media content has been recorded and/or stored, or the like. When the amount satisfies a threshold, media server 210 may determine to replace a local segment identifier, for the segment of media content, with a remote segment identifier for the segment of media content. In this way, media server 210 may conserve memory resources.

As further shown in FIG. 4, process 400 may include replacing the first segment identifier with the second segment identifier (block 450). For example, media server 210 may replace, in the playlist, the first segment identifier (e.g., a local segment identifier) with the second segment identifier (e.g., a remote segment identifier) based on determining to replace the first segment identifier with the second segment identifier. Media server 210 may replace a local segment identifier, included in the playlist, by replacing first text for the local segment identifier with second text for a remote segment identifier. The local segment identifier and the remote segment identifier may identify the same segment of media content (or a copy of the same segment of media content), but may point to different locations where the segment of media content is stored (e.g., local storage vs. remote storage).

Additionally, or alternatively, media server 210 may delete the segment, for which the local segment identifier was replaced, from local memory. For example, media server 210 may delete the segment from memory after replacing the local segment identifier with the remote segment identifier. Thus, the segment may be accessed from a memory of media server 210 at a first time, and may not be accessed from the memory of media server 210 at a second (e.g., later) time, but may be accessed from a memory of media storage device 230 at the second time. In this way, the segment may still be accessed (e.g., using the remote segment identifier), but need not be stored locally by media server 210, thereby conserving memory resources of media server 210, reducing energy usage of media server 210, etc.

In some implementations, media server 210 may replace a local segment identifier for an oldest segment (e.g., a least recently received segment) for which a local segment identifier is included in the playlist. Additionally, or alternatively, media server 210 may delete the oldest segment from local memory. In other words, media server 210 may store a more recently received segment locally, and may not store a less recently received segment locally. In some implementations, media server 210 may locally store only one most recently received segment (e.g., a segment that is currently being received and/or has been received most recently without another segment being received). In some implementations, media server 210 may locally store a particular quantity of most recently received segments. In either case, when a new segment is received, media server 210 may replace a local segment identifier for the oldest segment for which a local segment identifier is included in the playlist, and may delete the oldest segment.

Media server 210 may determine a remote segment identifier corresponding to a local segment identifier to be replaced. For example, media server 210 may receive the remote segment identifier from another device. In some implementations, media server 210 may receive the remote segment identifier from media storage device 230 (e.g., media storage device 230 that stores the segment of media content). Additionally, or alternatively, media server 210 may subscribe to receive a master playlist that includes remote segment identifiers, and may determine the remote segment identifier using the master playlist. In some implementations, media server 210 may instruct a particular media storage device 230 to record and/or store media content. Media server 210 may determine the remote segment identifier based on the particular media storage device 230 (e.g., a network address of the particular media storage device 230). Additionally, or alternatively, media server 210 may request and/or receive the remote segment identifier from the particular media storage device 230. Additionally, or alternatively, media server 210 may request that media storage device 230 record and/or store media content, and media storage device 230 may push segment identifiers to media server 210 thereafter (e.g., without further requests from media server 210 for the segment identifiers).

As further shown in FIG. 4, process 400 may include using and/or providing the playlist for access to the segment of the media content (block 460). For example, media server 210 may use the playlist to access the media content, including the segment of media content. Additionally, or alternatively, media server 210 may provide the playlist to another device, such as media client 220, to permit the other device to access the media content, including the segment of media content. In some implementations, the playlist may be used to access one or more segments from media server 210 (e.g., one or more segments stored locally on media server 210), and to access one or more segments from media storage device 230 (e.g., one or more segments stored remote from media server 210). For example, a first segment may be requested and/or received from a memory local to media server 210, and a second segment may be requested and/or received from a memory remote from media server 210.

Media server 210 and/or media client 220 may use the playlist to perform one or more operations associated with playback of the media content. For example, media server 210 and/or media client 220 may use the playlist to request and/or receive segments of media content using a segment identifier (e.g., a local segment identifier, a remote segment identifier, etc.). The segments may be requested and/or received for playback of media content, for rewinding media content, for pausing media content, for fast-forwarding media content (e.g., after pausing and/or rewinding the media content), or the like. By replacing local segment identifiers with remote segment identifiers in a playlist, and by deleting old segments associated with the local segment identifiers, media server 210 conserves memory resources, energy, and the like, while still permitting the old segments to be accessed via a remote storage device (e.g., media storage device 230).

Additionally, or alternatively, the playlist may permit rewinding and/or playback of media content that was broadcast at a point in time prior to tuning to a particular channel (e.g., prior to receiving input to access the media content). For example, after media server 210 tunes to a channel, media server 210 may begin recording and/or storing media segments associated with the channel. Furthermore, media server 210 may request remote segment identifiers for media segments provided prior to tuning to the channel, and may add the remote segment identifiers to the playlist (e.g., in an appropriate order). In this way, a user may provide input to rewind and/or playback segments of media content from a point in time prior to tuning to a channel. Thus, if the user misses the beginning of a television program, for example, the user may rewind the television program to view the television program from the beginning, even though media server 210 did not receive the segments as the segments were broadcast.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein allow a media server to offload storage of media content to remote storage devices, and to generate a playlist that permits access to the media content from the remote storage devices. In this way, the media server may conserve resources, such as memory resources, processing resources, power, or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors to:
     receive a segment of media content;
     store the segment in a first location that is local to the device;
     generate a playlist, for accessing the media content, that includes a first segment identifier that identifies the first location;
     determine that the first segment identifier is to be replaced with a second segment identifier that identifies a second location from which the segment is accessible,
       the second location being a location that is remote from the device;
     replace, in the playlist, the first segment identifier with the second segment identifier based on determining that the first segment identifier is to be replaced with the second segment identifier;
     delete, based on replacing the first segment identifier with the second segment identifier, the segment from the first location; and
     access the segment from the second location.

2. The device of claim 1, where the one or more processors are further to:
   receive input, from a media client, to access the media content; and
   provide the playlist to the media client.

3. The device of claim 1, where the one or more processors, when accessing the segment from the second location, are to:
   access the segment from the second location, using the playlist, after replacing the first segment identifier with the second segment identifier.

4. The device of claim 1, where the one or more processors are further to:
   tune to a channel; and
   where the one or more processors, when receiving the segment of the media content, are to:
     receive the segment of the media content based on tuning to the channel.

5. The device of claim 1, where the one or more processors are further to:
   output the segment for playback; and
   where the one or more processors, when determining that the first segment identifier is to be replaced with the second segment identifier, are to:
     determine that the first segment identifier is to be replaced with the second segment identifier based on outputting the segment for playback.

6. The device of claim 1, where the one or more processors are further to:
   determine a quantity of segments of the media content stored locally by the device; and
   determine that the quantity satisfies a threshold; and
   where the one or more processors, when determining that the first segment identifier is to be replaced with the second segment identifier, are to:
     determine that the first segment identifier is to be replaced with the second segment identifier based on determining that the quantity satisfies the threshold.

7. The device of claim 1, where the one or more processors are further to:
   receive another segment of the media content;
   determine whether the other segment is a most recently received segment;
   store, based on determining that the other segment is the most recently received segment, the other segment in a third location that is local to the device; and
   update the playlist to:
     include a third segment identifier that identifies the third location, and
     replace a local segment identifier with a remote segment identifier.

8. A non-transitory computer-readable medium storing instructions, the instructions comprising:
   one or more instructions that, when executed by one or more processors of a device, cause the one or more processors to:
     receive a segment of media content;
     store the segment in a first location that is local to the device;
     generate a playlist, for accessing the media content, that includes a local segment identifier that permits the segment of the media content to be accessed from the first location;
     determine that the local segment identifier is to be replaced, in the playlist, with a remote segment identifier that identifies a second location that permits the segment of the media content to be accessed from the second location,
       the second location being a location that is remote from the device;
     replace, in the playlist, the local segment identifier with the remote segment identifier based on determining that the local segment identifier is to be replaced with the remote segment identifier;
     delete the segment from the first location after determining that the local segment identifier is to be replaced with the remote segment identifier; and
     access the segment from the second location.

9. The non-transitory computer-readable medium of claim 8, where the playlist includes a first segment identifier and a second segment identifier,
   the first segment identifier identifying a local location, local to the device, where a first segment of the media content is stored, and
   the second segment identifier identifying a remote location, remote from the device, where a second segment of the media content is stored,
      the second segment being different from the first segment.

10. The non-transitory computer-readable medium of claim 8, where the one or more instructions, when executed by the one or more processors, further cause the one or more processors to:
   use or provide the playlist for access to the segment.

11. The non-transitory computer-readable medium of claim 8, where the one or more instructions, when executed by the one or more processors further cause the one or more processors to:
   determine a quantity of local segment identifiers, that identify segments of the media content stored locally by the device, included in the playlist; and
   determine that the quantity satisfies a threshold; and
   where the one or more instructions, that cause the one or more processors to determine that the local segment identifier is to be replaced with the remote segment identifier, cause the one or more processors to:
      determine that the local segment identifier is to be replaced with the remote segment identifier based on determining that the quantity satisfies the threshold.

12. The non-transitory computer-readable medium of claim 8, where the segment is a first segment of the media content;
   where the one or more instructions, when executed by the one or more processors, further cause the one or more processors to:
   determine that a second segment of the media content has been received,
      the second segment being different from the first segment; and
   where the one or more instructions, that cause the one or more processors to determine that the local segment identifier is to be replaced with the remote segment identifier, cause the one or more processors to:
      determine that the local segment identifier is to be replaced with the remote segment identifier based on determining that the second segment of the media content has been received.

13. The non-transitory computer-readable medium of claim 8, where the one or more instructions, when executed by the one or more processors further cause the one or more processors to:
   determine a quantity of segments of the media content that have been received since the playlist has been updated; and
   determine that the quantity satisfies a threshold; and
   where the one or more instructions, that cause the one or more processors to determine that the local segment identifier is to be replaced with the remote segment identifier, cause the one or more processors to:
      determine that the local segment identifier is to be replaced with the remote segment identifier based on determining that the quantity satisfies the threshold.

14. The non-transitory computer-readable medium of claim 8, where the one or more instructions, when executed by the one or more processors, further cause the one or more processors to:
   receive input to perform a rewind operation associated with the media content; and
   where the one or more instructions, that cause the one or more processors to access the segment from the second location, cause the one or more processors to:
      access, using the playlist, the segment from the second location, based on receiving the input to perform the rewind operation.

15. A method, comprising:
   receiving, by a device, a segment of media content;
   storing, by the device, the segment of the media content in a first location that is local to the device;
   generating, by the device, a playlist for accessing the media content,
      the playlist including a first segment identifier that identifies the first location;
   determining, by the device, that the first segment identifier is to be replaced with a second segment identifier that identifies a second location from which the segment of the media content is accessible,
      the second location being a location that is remote from the device;
   modifying, by the device, the playlist to replace the first segment identifier with the second segment identifier based on determining that the first segment identifier is to be replaced with the second segment identifier;
   deleting, by the device and based on replacing the first segment identifier with the second segment identifier, the segment of the media content from the first location; and
   using or providing the playlist to access the segment from the second location and permit an operation, associated with playback of the media content, to be performed.

16. The method of claim 15, where the operation includes at least one of:
   a playback operation to play the media content,
   a pause operation to pause the media content,
   a rewind operation to rewind the media content, or
   a fast-forward operation to fast-forward the media content.

17. The method of claim 15, further comprising:
   determining that one or more conditions are satisfied; and
   where determining that the first segment identifier is to be replaced with the second segment identifier comprises:
      determining that the first segment identifier is to be replaced with the second segment identifier based on determining that the one or more conditions are satisfied.

18. The method of claim 15, further comprising:
   determining an amount of time that has elapsed since the segment of the media content has been received or stored; and
   determining that the amount of time satisfies a threshold; and
   where determining that the first segment identifier is to be replaced with the second segment identifier comprises:
      determining that the first segment identifier is to be replaced with the second segment identifier based on determining that the amount of time satisfies the threshold.

19. The method of claim 15, further comprising:
determining that the segment of the media content is a least recently received segment corresponding to a segment identifier included in the playlist; and
where determining that the first segment identifier is to be replaced with the second segment identifier comprises:
determining that the first segment identifier is to be replaced with the second segment identifier based on determining that the segment of the media content is the least recently received segment corresponding to a segment identifier included in the playlist.

20. The method of claim 15, further comprising:
determining at least one of:
a first amount of used memory space on the device,
a second amount of unused memory space on the device, or
a third amount of memory space used to store one or more segments of the media content on the device;
determining that the first amount, the second amount, or the third amount satisfies a threshold; and
where determining that the first segment identifier is to be replaced with the second segment identifier comprises:
determining that the first segment identifier is to be replaced with the second segment identifier based on determining that the first amount, the second amount, or the third amount satisfies the threshold.

* * * * *